US008112537B2

(12) United States Patent
Guenther et al.

(10) Patent No.: US 8,112,537 B2
(45) Date of Patent: Feb. 7, 2012

(54) TRICKLE SYNC PROTOCOL (75) Inventors: Carsten Guenther, San Francisco, CA (US); Brendan A. McCarthy, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 12/240,538

(22) Filed: Sep. 29, 2008

(65) Prior Publication Data

US 2010/0082732 A1  Apr. 1, 2010

(51) Int. Cl.
G06F 15/16 (2006.01)
(52) U.S. Cl. ......... 709/230; 709/203; 709/248; 709/224
(58) Field of Classification Search .................. 709/203, 709/230, 217–219, 223–224, 248
See application file for complete search history.

(56) References Cited

U.S. PATENT DOCUMENTS

| | | | |
|---|---|---|---|
| 5,684,984 A | 11/1997 | Jones et al. | |
| 5,706,509 A | 1/1998 | Man | |
| 5,728,335 A | 3/1998 | Neubauer | |
| 5,884,325 A | 3/1999 | Bauer et al. | |
| 5,987,376 A | 11/1999 | Olson et al. | |
| 6,173,335 B1 | 1/2001 | Culbert et al. | |
| 6,182,141 B1 | 1/2001 | Blum et al. | |
| 6,247,135 B1 * | 6/2001 | Feague | 707/999.201 |
| 6,253,228 B1 * | 6/2001 | Ferris et al. | 709/248 |
| 6,341,291 B1 | 1/2002 | Bentley et al. | |
| 6,430,576 B1 | 8/2002 | Gates et al. | |
| 6,823,456 B1 | 11/2004 | Dan et al. | |
| 6,829,655 B1 * | 12/2004 | Huang et al. | 709/248 |
| 6,910,052 B2 | 6/2005 | Gates et al. | |
| 6,970,876 B2 | 11/2005 | Hotti et al. | |
| 7,149,813 B2 * | 12/2006 | Flanagin et al. | 709/248 |
| 7,747,784 B2 * | 6/2010 | McCarthy et al. | 709/248 |
| 2002/0026474 A1 * | 2/2002 | Wang et al. | 709/203 |
| 2002/0029227 A1 | 3/2002 | Multer et al. | |
| 2004/0019614 A1 | 1/2004 | Wang | |

(Continued)

FOREIGN PATENT DOCUMENTS

EP     1014266 A2    6/2000

(Continued)

OTHER PUBLICATIONS

PCT Notification of Transmittal of the International Search Report and Written Opinion of the International Search Authority, or the Declaration in PCT/US2009/058414 dated Feb. 23, 2010.

(Continued)

Primary Examiner — Philip B Tran
(74) Attorney, Agent, or Firm — Fish & Richardson P.C.

(57) ABSTRACT

Among other things, techniques and systems are disclosed for providing trickle syncing. In one aspect, a system includes a data repository to store one or more data records and a server in communication with the data repository. The server is designed to access the data repository in response to a user request to perform at least one of the following: access the one or more data records, add a data record, and modify the one or more data records. The system also includes a client application in communication with the server. The client application is designed to receive the user request through a client process; encapsulate a protocol that provides communications between the client process and the server; and forward the received user request to the server using the encapsulated protocol.

30 Claims, 7 Drawing Sheets

U.S. PATENT DOCUMENTS

| | | | |
|---|---|---|---|
| 2004/0103174 | A1 | 5/2004 | Balducci et al. |
| 2004/0133591 | A1 | 7/2004 | Holenstein et al. |
| 2005/0055382 | A1 | 3/2005 | Ferrat et al. |
| 2005/0102328 | A1 | 5/2005 | Ring et al. |
| 2005/0198084 | A1 | 9/2005 | Kim |
| 2006/0075105 | A1 | 4/2006 | Momtchilov et al. |
| 2006/0112150 | A1* | 5/2006 | Brown et al. ............... 707/201 |
| 2006/0136511 | A1 | 6/2006 | Ngo et al. |
| 2006/0136513 | A1 | 6/2006 | Ngo et al. |
| 2006/0150079 | A1 | 7/2006 | Albornoz et al. |
| 2006/0242210 | A1 | 10/2006 | Ring et al. |
| 2006/0259524 | A1 | 11/2006 | Horton |
| 2007/0100834 | A1 | 5/2007 | Landry et al. |
| 2007/0162518 | A1 | 7/2007 | Tian |
| 2007/0226272 | A1 | 9/2007 | Huang et al. |
| 2007/0255744 | A1 | 11/2007 | Gideoni et al. |
| 2007/0260475 | A1* | 11/2007 | Bhanote ............... 705/1 |
| 2008/0155112 | A1* | 6/2008 | Ma et al. ............... 709/231 |
| 2009/0198702 | A1* | 8/2009 | Novik et al. ............... 707/10 |

FOREIGN PATENT DOCUMENTS

| | | |
|---|---|---|
| EP | 1291770 A2 | 3/2003 |
| GB | 2421606 A | 6/2006 |
| WO | WO 2005/116892 A1 | 12/2005 |
| WO | WO 2006/132534 A1 | 12/2006 |

OTHER PUBLICATIONS

Extended European Search Report in EP Patent Application No. 09171413.9 dated Feb. 18, 2010.

Extended European Search Report in EP Patent Application No. 08161817.5 dated Aug. 3, 2009.

European Examination Report in EP Patent Application No. 08161817.5 dated Mar. 4, 2010.

Extended European Search Report in EP Patent Application No. 09154249.8 dated Jun. 24, 2009.

Office Action in U.S. Appl. No. 12/607,921 mailed Oct. 1, 2010, 29 pages.

Fielding, Roy Thomas. "Architectural Styles and the Design of Network-based Software Architectures: Dissertation." University of California, Irvine, 2000.

PCT Invitation to Pay Additional Fees in PCT/US2008/071812 dated Apr. 28, 2009.

European Search Report in Application No. 08161817.5 dated May 8, 2009.

Notification of Transmittal of the International Search Report and the Written Opinion of the International Searching Authority, or the Declaration in PCT/US2008/071812 dated Jul. 3, 2009.

Non-Final Office Action in U.S. Appl. No. 11/834,604 dated Nov. 27, 2009.

Apple Inc., Sync Services Programming Guide, Cocoa > Syncing [Online], XP-002532278, Oct. 31, 2007, © 2004, 2007 Apple Inc., Cupertino, pp. 1-372, URL: http://developer.apple.com/documentation/Cocoa/Conceptual/SyncServices/SyncServices.pdf.

PCT Notification of Transmittal of the International Search Report and the Written Opinion of the International Search Authority, or the Declaration in PCT/US2009/035909 dated Jul. 14, 2009.

Extended European Search Report in Application No. 09154256.3 dated Jul. 2, 2009.

Apple Inc., "Sync Services Framework Reference, Cocoa > Syncing," [Online] Oct. 31, 2007, XP002532279, © 2004, 2007 Apple Inc., URL:http://developer.apple.com/documentation/Cocoa/Reference/SyncServicesRef_ObjC/SyncServicesRef_ObjC.pdf, pp. 1-275.

Luca Prati et al., "XDMS-Network Address Book enabler," Hewlett-Packard OpenCall Software, pp. 1-4, 2007.

OMA Open Mobile Alliance, "SyncML Data Sync Protocol, Candidate Version 1.2—Jun. 1, 2004," Open Mobile Alliance, OMA-SyncML-DataSyncProtocol-V1_2-200400601-C, 2004 Open Mobile Alliance Ltd., XP-002375712, pp. 1-77.

PCT Notification of Transmittal of the International Search Report and Written Opinion of the International Search Authority, or the Declaration in PCT/US2009/035912 dated Jun. 5, 2009.

* cited by examiner

| Type | Description | Example |
|---|---|---|
| string | the string itself | I am a string! |
| enum | same as string, except that the value is from a fixed list of valid values | work |
| number (incl. bool) | string representation of the value. A boolean type is either "0" or "1" | 12.3 |
| date | string representation in the format yyyymmddThhmmssZ | 20070415T123000Z |
| calendar date | string representation in the format yyyymmddThhmmssZ tzid | 20070415T123000Z US/Pacific |
| url | string representation of the URL | http://www.apple.com |
| color | space-separated list of the color components red, green, blue and alpha | 0.17254902 0.6313726 0.043137256 1.0 |
| data | base-64 encoded binary data. However, certain properties, when configured properly will return an URL to the data and it is the client's responsibility to fetch that data when needed. As an example addressbook images are treated that way. | /9jAKACgAoAKACgAoAKACgAoAKACgD/2Q== |
| array, set | list of *i* child elements representing the items | \<sync:i\>foo\</sync:i\> \<sync:i\>bar\</sync:i\> |

FIG. 3

```
<sync:add guid="4A333A59-8199-469E-B4EB-D6A75C0BD3BA" type="com.apple.contacts.Contact">
    <sync:set name="com.apple.syncservices.RecordEntityName">com.apple.contacts.Contact</sync:set>
    <sync:set name="display as company">person</sync:set>
    <sync:set name="first name">Homer</sync:set>
    <sync:set name="last name">Simpson</sync:set>
    <sync:set name="company name">Springfield Nuclear Power Plant</sync:set>
    <sync:set name="hobby">Pluto</sync:set>
    <sync:set name="job title">Nukelar Expert</sync:set>
    <sync:set name="notes">A note</sync:set>
    <sync:set name="short name">Homer</sync:set>
    <sync:set name="suffix">Mr</sync:set>
    <sync:set name="birthday">19500813T000000Z GMT</sync:set>
    <sync:set name="email addresses">
        <sync:i>22CA87A4-06B4-4D65-98C0-5E9A2D866132</sync:i>
    </sync:set>
    <sync:set name="primary email address">
        <sync:i>22CA87A4-06B4-4D65-98C0-5E9A2D866132</sync:i>
    </sync:set>
</sync:add>
<sync:add guid="22CA87A4-06B4-4D65-98C0-5E9A2D866132" type="com.apple.contacts.Email Address">
    <sync:set name="com.apple.syncservices.RecordEntityName">com.apple.contacts.Email Address</sync:set>
    <sync:set name="type">work</sync:set>
    <sync:set name="value">homer@springfieldpower.com</sync:set>
    <sync:set name="contact">
        <sync:i>4A333A59-8199-469E-B4EB-D6A75C0BD3BA</sync:i>
    </sync:set>
</sync:add>
<sync:modify guid="8994F437-221A-4685-84CA-545ED21D02D7">
    <sync:set name="members">
        <sync:i>4A333A59-8199-469E-B4EB-D6A75C0BD3BA</sync:i>
    </sync:set>
</sync:modify>
<sync:delete guid="CEB39C18-8F74-492B-91ED-38C2F460F102" />
</sync:add>
```

FIG. 4

PUT REQUEST

```
PUT /sync/jdoe/com.apple.Contacts HTTP/1.1
Host: sync.mac.com:2136
X-ClientID: Addressbook
Authorization: QmFzaWMgamRvZToxMjM0NTY=
...

<sync:request xmlns:sync="urn:dotmac:xmlns:sync">
  <sync:delete guid='36A10B69-1902-482A-BFD9-8934AB127635'/>
  <sync:modify guid='4A333A59-8199-469E-B4EB-D6A75C0BD3BA'>
    <sync:set name='company name'>Dunkin Donuts</sync:set>
    <sync:set name='phone numbers'>
      <sync:i>5C4CBC6B-D515-459C-94B1-666BF0BCCDB1</sync:i>
    </sync:set>
  </sync:modify>
</sync:request>
```

FIG. 5a

RESPONSE TO PUT REQUEST

```
HTTP/1.1 200 OK
...
```

TRICKLE SYNC PROTOCOL

TECHNICAL FIELD

This application relates to syncing data between a server and one or more client processes.

BACKGROUND

Processing a request from a user to sync data with a central data repository can be performed using different sync protocols. Different sync protocols may be desirable for different types of network connections, such as an over the air connection or a wired connection. Also, the scalability of the different sync protocols can be affected by the complexity of the behind-the-scene details of the sync protocols that regulate how and when to sync the requested data. Further, different client processes may be required to perform various integrity checks before communications can be allowed with the sync server.

SUMMARY

Among other things, techniques and systems are disclosed for providing a sync server that performs various sync server processes.

In one aspect, a system includes a data repository to store one or more data records and a server in communication with the data repository. The server is designed to access the data repository in response to a user request to perform at least one of the following: access the one or more data records, add a data record, and modify the one or more data records. The system also includes a client application that includes a protocol library in communication with the server. The client application is designed to receive the user request through a client process; encapsulate a protocol that provides communications between the client process and the server; and forward the received user request to the server using the encapsulated protocol.

Implementations can optionally include one or more of the following features. The client application can include a Java software development kit (SDK). The client application can be embedded within the client process. Alternatively, the client application can be designed to operate as a server-side process. The client application can receive the user request through the client process that includes a web browser. The client application can encapsulate the protocol so that the client process can communicate with the server without knowledge of details of the protocol. The client application can encapsulate the protocol so that the server identifies the client process as a trusted client, wherein the server assumes correctness of data provided by the trusted client. The server can, in response to the forwarded request, access the data repository; obtain data identified in the forwarded request from the one or more data records; and forward the obtained data identified in the forwarded request in a reply message to the client application. The client application can include a cache to temporarily store the data received in the reply message from the server. The client application can receive another request through the client process; detect whether the temporarily stored data is valid; and access the temporarily stored data instead of forwarding the received other request to the server when detecting that the temporarily stored data is valid.

In another aspect, a method includes storing one or more data records in a data repository. At a client application, a request can be received from a user interfacing at a client process to access the one or more data records, add a data record, and modify the one or more data records. A protocol that provides communications between the client process and a server is encapsulated. The received user request is forwarded to the server using the encapsulated protocol. Also, at a server, the data repository is accessed in response to the forwarded user request.

Implementations can optionally include one or more of the following features. The receiving, encapsulating and forwarding can be performed at the client application that includes a Java software development kit (SDK). The receiving, encapsulating and forwarding can be performed at the client application that is embedded within the client process. The receiving, encapsulating and forwarding can be performed at the client application that operates as a server-side process. The receiving can include receiving the user request through the client process that includes a web browser. The encapsulating can include encapsulating the protocol so that the client process can communicate with the server without knowledge of details of the protocol. The encapsulating can include encapsulating the protocol so that the server identifies the client process as a trusted client, wherein the server assumes correctness of data provided by the trusted client. Also, at the server, in response to the forwarded request, the data repository can be accessed; data identified in the forwarded request can be obtained from the one or more data records; and the obtained data identified in the forwarded request can be forwarded to the client application in a reply message. At a cache associated with the client application, the data received in the reply message from the server can be temporarily stored. At the client application, operations can be performed including receiving another request from the user through the client process; detecting whether the temporarily stored data is valid; and accessing the temporarily stored data instead of forwarding the received other request to the server when detecting that the temporarily stored data is valid.

In another aspect, the techniques and systems described in this specification can be implemented as a computer program product, embodied on a computer readable medium, operable to cause a data processing apparatus to perform operations including storing one or more data records in a data repository. In addition, at a client application that includes a protocol library, the computer program product is operable to cause a data processing to receive from a user interfacing at a client process, a request to access the one or more data records, add a data record, and modify the one or more data records. The computer program product is operable to cause a data processing apparatus to encapsulate a protocol that provides communications between the client process and a server, and forward the received user request to the server using the encapsulated protocol. Further, the computer program product is operable to cause a data processing apparatus to, at a server, access the data repository in response to the forwarded user request.

Implementations can optionally include one or more of the following features. The computer program product can be further operable to cause a data processing apparatus to perform the receiving, encapsulating and forwarding at the client application that comprises a Java software development kit (SDK). The computer program product can be further operable to cause a data processing apparatus to perform the receiving, encapsulating and forwarding at the client application that is embedded within the client process. The computer program product can be further operable to cause a data processing apparatus to perform the receiving, encapsulating and forwarding at the client application that operates as a server-side process. The computer program product can be further operable to cause a data processing apparatus to receive the user request through the client process that comprises a web browser. The computer program product can be further operable to cause a data processing apparatus to encapsulate the protocol so that the client process can communicate with the server without knowledge of details of the protocol. The computer program product can be further operable to cause a data processing apparatus to encapsulate the protocol so that the server identifies the client process as a trusted client, wherein the server assumes correctness of data provided by the trusted client. The computer program product can be further operable to cause a data processing apparatus to perform operations at the server, in response to the forwarded request, including accessing the data repository; obtaining data identified in the forwarded request from the one or more data records; and forwarding the obtained data identified in the forwarded request in a reply message to the client application. The computer program product can be further operable to cause a data processing apparatus to perform operations at a cache associated with the client application, including temporarily storing the data received in the reply message from the server. The computer program product can be further operable to cause a data processing apparatus to perform operations including at the client protocol, receiving another request through the client process; detecting whether the temporarily stored data is valid; and accessing the temporarily stored data instead of forwarding the received other request to the server when detecting that the temporarily stored data is valid.

Techniques and systems according to the present specification can be implemented to potentially provide various advantages. The client application, such as the Java SDK encapsulates the sync protocol so that the client process can communicate with the sync server without any knowledge of the details of the sync protocol. For example, the client process does not need to determine whether the data has been changed by another client process and needs to update the stored cache, etc. Thus, the client process using the Java SDK, for example, can deal with the abstraction as if the data is locally available. In addition, any client process that uses the Java SDK is identified as a trusted client. The trusted client is assumed to provide correct or valid data. When interfacing with a trusted client, the sync server can skip certain integrity checks that may be necessary for untrusted clients because the correctness of the data provided by the trusted client is assumed.

BRIEF DESCRIPTION OF THE DRAWINGS

FIG. 4 shows an example sync message for adding two new records, modifying a record and deleting another record.

Like reference symbols and designations in the various drawings indicate like elements.

DETAILED DESCRIPTION

Techniques and systems are disclosed for providing a scalable protocol that manages synchronizations between a server and multiple client processes.

Synchronization is a process of maintaining consistency between two distinct data stores by periodically comparing the changes which have occurred to each since the last time the data stores were known to be consistent. The data stores can include a client process, such as client devices on one side and a sync server on the other side. To synchronize data between the two sides, the data stores are configured with various capabilities. For example, each data store is configured to supply all data when requested. In addition, each data store is configured to identify and supply changes since the time of the last synchronization. Each data store is configured to agree on the schema to be kept in sync. Each data store is configured to agree on the data representation. Each data store is configured to agree on the semantics of synchronization primitives (i.e. add, update, delete). Further, each data store is configured to rollback to a previous state should a problem occur during a sync to avoid corrupting the data stores.

The synchronized data follows a relational model and is divided into dataclasses that group definitions of structured data types or entities. Each dataclass is represented by a schema, which is a network of related entities and properties. Entities within a given dataclass may refer to one another using relationships. Relationships between entities in discrete dataclasses are forbidden, and thus each dataclass is wholly independent of other dataclasses. From a user's perspective, dataclasses may appear to be managed from separate dedicated applications. For example, the contacts dataclass can be managed primarily by an address book application, while the calendars dataclass can be managed by a calendar application.

The sync server supports various synchronization modes including slow, reset and fast. The first time a client process syncs with a server, all data for a dataclass are exchanged to match existing data items that are considered identical. To optimize syncing and network bandwidth usage for subsequent sync operations, the client process and the sync server can exchange only the data that has changed since the last time the pair synchronized. Thus, each entity is capable of determining what local changes should be sent to the other entity. In addition, each entity is able to detect whether a situation has occurred which require exchanging more data before fast syncing can be resumed.

The slow sync mode may be used when the client process and sync server sync for the first time to establish a common baseline for subsequent difference-only data exchange. During a slow sync, the client process sends all data for a dataclass to the sync server. The sync server attempts to match these data items with those that are already known to the sync server. Failure to perform proper identity matching can result in duplicated data. The sync server then responds with data items missing at the client process.

The reset sync mode is used to reset all data for the dataclass on the client process with the sync server's data. This can occur when the data structure has been pushed to the client process, or when the sync server or client process determines that the local data is corrupt. The client process sends no data, and the sync server responds with the complete data structure for the dataclass.

The fast sync mode is the most efficient mode. The client process sends only those data that have changed since the last sync with the sync server. The sync server responds with only those data that have changed external to the client process.

Figure 1A:
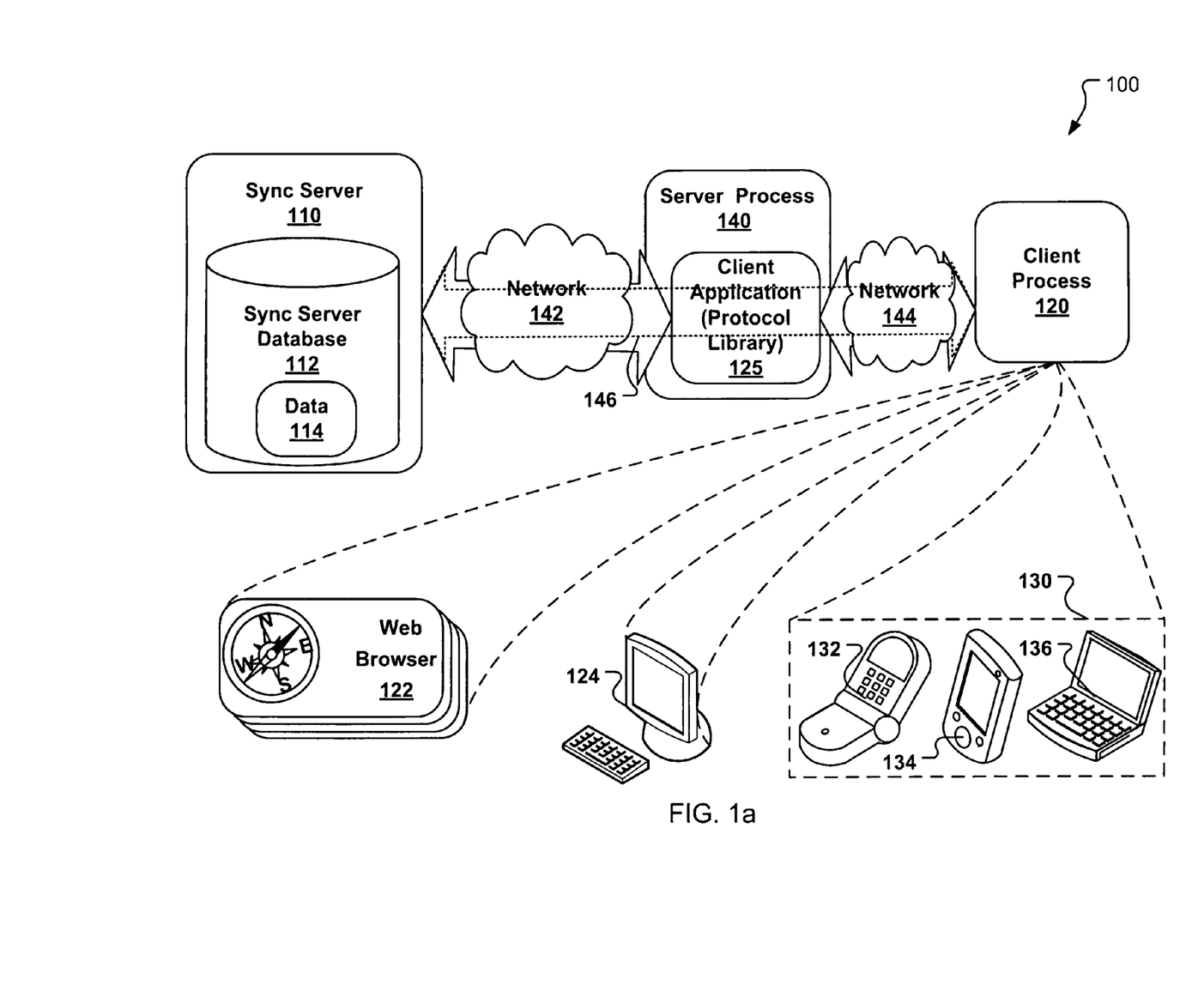
FIG. 1a is a block diagram showing an example system for synchronizing data between a server and multiple client processes.

FIG. 1a is a block diagram showing an example system 100 for synchronizing data between a server and multiple client processes. A sync server 110 is communicatively connected to a server process 140 over a network 142. The server process 140 is communicatively connected to one or more client processes 120 over a network 144. The networks 142 and 144 can be the same network or different networks. The sync server 110 includes a data repository or store 112 that stores data 114 that conforms to a relational model and/or schema. The stored data can be synced with the client process 120 using a client application that includes a protocol library 125 running on the server process 140.

The sync server 110 is a scalable solution for providing multiple client processes 120, such as web clients with read/write access to the data store 112. The sync server 110 manages sync transactions for the multiple client processes to update one or more data records stored in the sync data repository 112. The sync server 110 processes the sync sessions, and the updated sync data repository 112 as needed.

A sync protocol 146 is provided to enable the client process 120 to access the stored data 114 and perform synchronization. The sync protocol 146 enables any client process 120 that can use and understand HTTP and XML to sync with the sync server 110. For example, the sync protocol 146 enables client processes, such as a Web browser 122, a mobile device 130, a computer 124, etc. to sync with the sync server 110. The mobile device 130 can include a mobile phone 132, a personal digital assistant 134, and other portable computing devices 136.

A client application that includes a protocol library 125 is provided to encapsulate the sync protocol 146 along with the functionalities of the sync protocol 146. The client application 125 can be implemented using various development tools, such as Java software development kit (SDK). The client application 125 can hide from the client process 120, the 'behind-the-scene' details of the sync protocol 125, such as determining whether the data 114 has been changed by another client process and needs to update the stored cache, etc. Thus, the client process 120 using the Java SDK, for example, can deal with the abstraction as if the data is locally available. Further, the details of syncing are not needed to develop a client process, such as a web application.

In FIG. 1a, the client application 125 is implemented, in Java SDK for example, to execute on another server process 140 that is in communication with the sync server 110. The client process 120 communicates with the server process 140, and the client application 125 encapsulate the sync protocol 146 to enable the server process 140 to access the data 114 on the sync server 110. Thus, through the server process 140, the client process 130 is able to access the data 114 stored on the sync server 110.

Figure 1B:
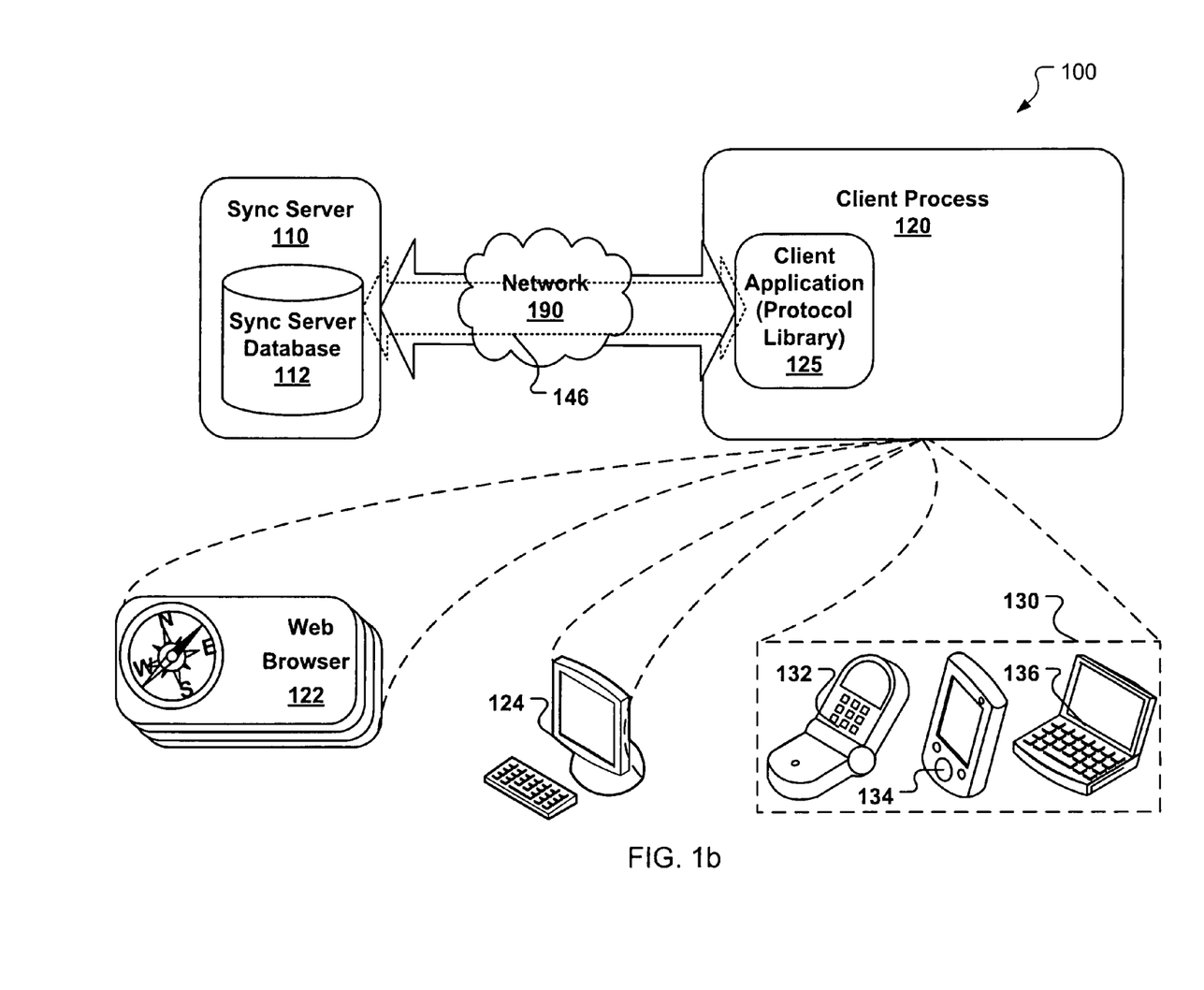
FIG. 1b shows another example implementation of a system for synchronizing data between a server and multiple client processes.

FIG. 1b shows another example implementation of a system for synchronizing data between a server and multiple client processes. In the example shown in FIG. 1b, the client application 125 is included in the client process 120. The client process 120 can use the client application 125 embedded within the client process 120 to communicate with the sync server 110 directly. For example, a JavaScript implementation of SDK (i.e., the client application 125) can be embedded inside a web browser 122 (i.e., the client process) to encapsulate the sync protocol 146. By using the JavaScript implementation or other mechanisms to encapsulate the sync protocol within the client process, an application layer, such as the server process 140 can be removed. Thus, the client process need not go through another application layer before communicating with the sync server 110. This enhances the scalability of the system 100.

As described above, the client process 120 is not limited to a web application. In some implementations, the sync protocol 146 is integrated into an operating system (OS) of a data processing device to enable a data processing device, such as the computer 124 or a mobile device 130 to sync with the sync server 110.

Figure 2:
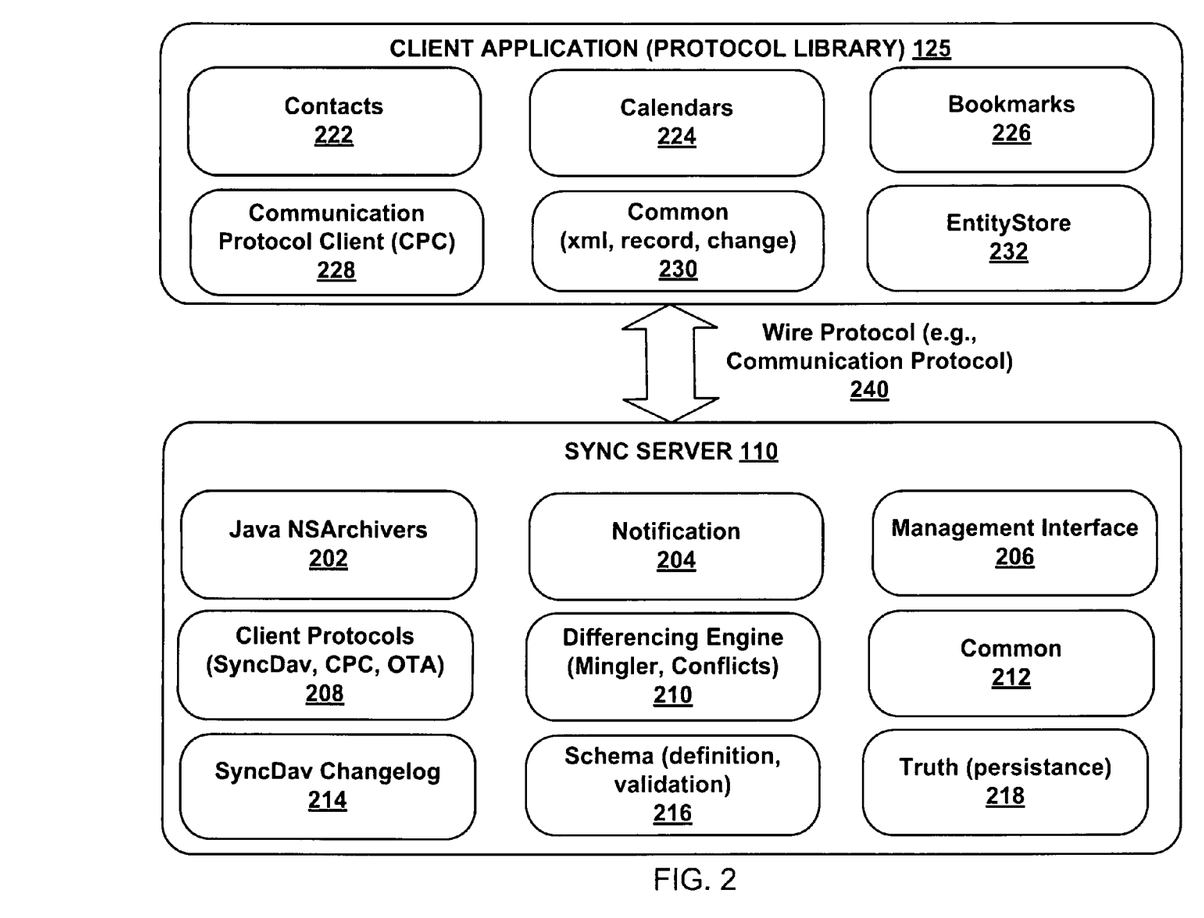
FIG. 2 is a block diagram showing an example of application architecture for syncing with a sync server.

FIG. 2 is a block diagram showing an example of an application architecture for syncing with a sync server. The sync server 110 includes various components that perform the various functions described in this specification. For example, the sync server 110 can include a Java NSArchivers component 202, a Notification mechanism 204, a Management Interface 206, Client Protocols mechanism 208, a Differencing Engine (Mingler, Conflicts) 210, a Common component 212, a SyncDAV Changelog component 214, a Schema (definition, validation) component 216 and a Truth (persistence) component 218. The server 110 is connected over a wire protocol 240 (e.g., the sync protocol 146) to a client application 125.

The client application 125 includes a Java library that provides access to the sync server 110 through sync server data access protocol (SDAP), without requiring specific protocol knowledge. As described above, this is accomplished by having the client application 125 encapsulate the communication protocol 146, for example. SDAP is a protocol for accessing the sync data repository 112 and performing synchronization. SDAP includes the XML schema for sync data repository data and changes. SDAP also includes the HTTP protocol semantics that define a URL scheme for dataclasses, records and properties. SDAP also includes the semantics for communication calls (e.g., HEAD, GET, PUT and DELETE). Further, SDAP includes custom X-headers for exchanging sync-specific data, such as client ids and sync anchors. An example process for trickle syncing is further described with respect to FIG. 5 below. The communication protocol 146 allows for trickle syncing, where small portions of data are sync each time instead of syncing all of the changes at once.

SDAP enables a client process 120 to interface with a sync server 110. The communication between the client process 120 and the sync server 110 is not encrypted when the client process 120 and the sync server 110 are both deployed internally on the server side as described with respect to FIG. 1a above. In addition, the sync server 110 or a separate gateway server can include authentication and session handling to support syncing with other client processes that support different protocols, such as an Over-the-Air (OTA) protocol. While the OTA protocol is designed for a cellular network with small bandwidth, the sync protocol 146 as described in this specification is designed to operate over a reliable, robust network. In addition, SDAP provides facilities for registering clients and enabling/disabling syncing for individual dataclasses.

SDAP enables the web clients 120 to synchronize with the sync server 110 and access the sync data repository 112 without requiring a complex client sync state machine. SDAP allows stateless access to synchronized data in the sync data repository 112 and other data repositories with response time goals in the sub-500 milliseconds range. SDAP can replace any existing protocol (e.g., Sync API) between various servers, such as the MobileMe servers (Replicant, SFDEs and the WOAs). In addition, SDAP enables syncing of various dataclasses including Contacts, Calendars and Bookmarks. The example dataclasses with Apple® extensions include "com.apple.Contacts," "com.apple.Calendars" and "com.apple.Bookmarks." Further, SDAP enables the client process 120 to trickle-sync with the sync server 110. A client application, a web client 120 for example, that wants to use SDAP must support field-level changes and preserve properties in their entirety as delivered by the API.

As described above, the client application 125 can be implemented as a Java library (e.g., Java SDK) that provides access to the sync server 110 through SDAP without requiring specific protocol knowledge. Such client application 125 can provide an object-model for the main dataclasses (Bookmarks, Contacts and Calendars) and enables clients to sync data with the sync server without necessarily having their own datastores. As described above, to improve server scalability, the client application 125 offloads the task of ensuring relational integrity enforcement from the sync server 110 to the client application (making a client process that uses the client application a trusted client) and eliminates the need for a Local Unique Identifier (LUID)-Universal Unique Identifier (UUID) mapping on the sync server 110. The client application 125 can be used by the MobileMe Contacts and Calendar Web-Oriented Architectures (WOAs) to sync with the sync server 110, for example.

SDAP defines its own XML schema to describe the sync data repository 112 and sync operations such as "record" and "property" changes. The XML schema for SDAP follows the data model of the sync server 110. For example, the XML schema can represent the entity records; properties; record changes such as add, modify and delete; property changes such as set and clear; and id-mapping.

The client application 125 includes various Java library components that can be used during a sync session with the sync server 110. The client application 125 can include the supported schemas or dataclasses defined by the sync server 110. These dataclasses can include Contacts 222, Calendars 224, and Bookmarks 226. Each of these dataclasses includes data items organized by relationships. The client application 125 can also include a SDAP Client component 228, a Common (XML, Record, Change) component 230 and an EntityStore 232.

The sync protocol 146 is a protocol for accessing the data 114 stored in the sync server and performing synchronization. The sync protocol 146 includes XML schema for the data 114 and changes to the data 114. The sync protocol 146 also includes HTTP protocol semantics that define a URL scheme for dataclasses, records and properties; the semantics for communication calls, such as HEAD, GET, PUT and DELETE; and custom X-headers for exchanging sync-specific data, such as client ids and sync anchors.

The sync protocol 146 defines its XML schema to describe the data 114 and sync operations (record and property changes). The XML schema follows a data model that represents entity records, properties, record changes (e.g., add, modify, delete), property changes (e.g., set, clear) and id-mappings.

A record element represents one record in the data 114 of an entity type. The attributes of the record element include (1) GUID: the record's GUID; (2) type: the record's type; (3) created: a timestamp when the record was created in the data 114; and (4) modified: a timestamp when the record was last modified.

Figure 3:
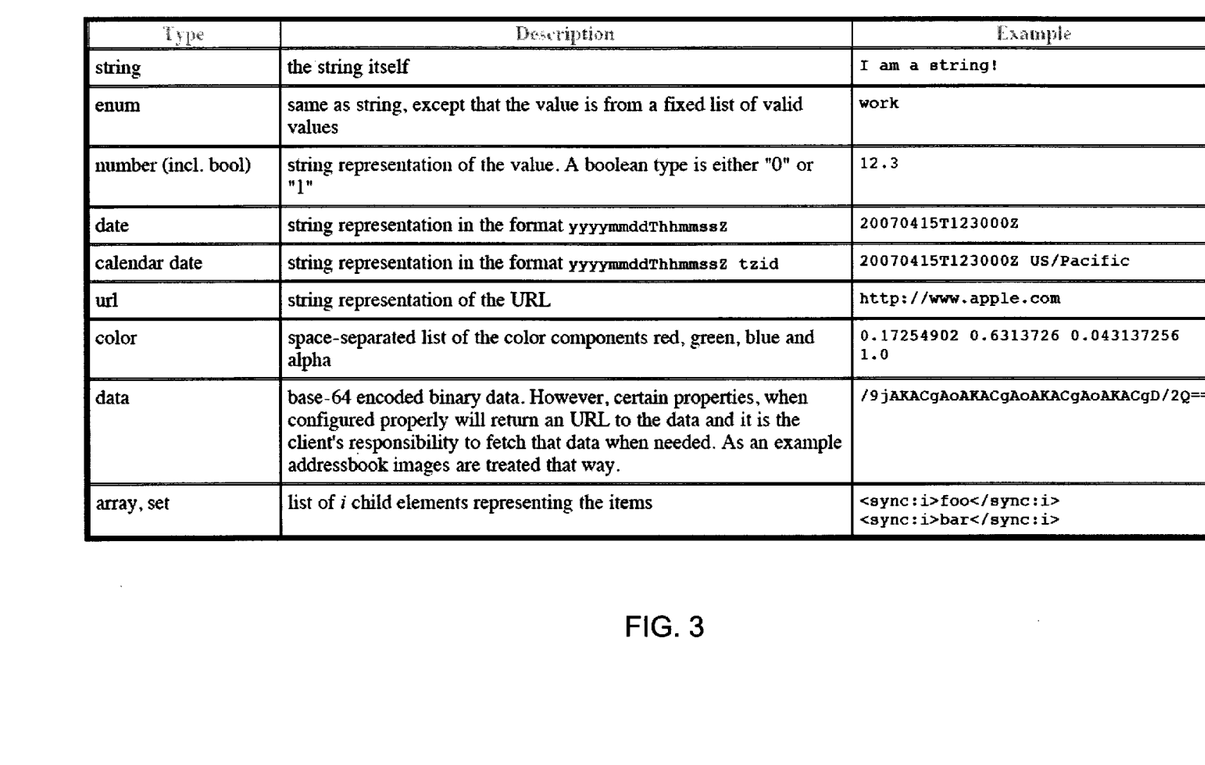
FIG. 3 shows examples of data types.

The record element includes one or more property and relationship child elements. A property element is a name-value pair. A single property is represented by the 'prop' element or the 'rel' element (for a relationship property). The value of a relationship property is the list of GUIDs of the related records. The attributes of a property element includes its name. The value of the element is a string representation of a property's value. The data types schema can be encoded using (1) string: a representation of a string itself; (2) enum: a string with an associated value from a fixed list of valid values; (3) number (including boolean): a string representation of a value (a Boolean type is either "0" or "1"); (4) date: a string representation in the format yyyymmddThhmmssZ; (5) url: a string representation of the URL; (6) color: a space-separated list of the color components red, green, blue and alpha; (7) data: base-64 encoded binary data, but sometimes an URL; and (8) array, set: a list of child elements representing the items. FIG. 3 shows examples of data types.

The XML schema includes three types of data changes: adds, modifies and deletes. Adds and modifies include a list of property changes. FIG. 4 shows an example sync message for adding two new records (a contact and an email address), modifying a record (a group, by adding the new contact) and deleting another record.

The XML schema also includes two types of property changes: set and clear. The property change element, clear does not include any node content. The content of the 'set property change' element is the new property value.

When a request to add a record is received, the sync server determines whether the submitted record is identical to an existing record yet unknown to the client, or a record coming from another client participating in the same sync. When a match is found, the record is not added to the data. Instead the sync server returns an id-mapping that identifies to the client process, the identity of the already present record that matched the submitted record.

The sync protocol 146 is a HTTP-based protocol that follows a representational state transfer (REST) based design. Every object, such as dataclass, record and property, in the sync protocol 146 is assigned a URL, and the sync protocol accesses the sync server to obtain data using HTTP methods including HEAD, GET, PUT and delete.

To initiate and end communication, the HEAD and DELETE methods are used. The sync process operates in statefulness mode when the client process is known by its GUID. The client process sends a HEAD call and supplies the client's GUID to allow the sync server to register the client process in its database and send identification to an associated application. By registering the client process GUID, the client process is known to the sync server, and when the client process is done syncing, the client process send a HTTP DELETE request to delete that GUID from the database and acknowledge that the client process is done syncing.

To exchange data, the PUT and GET methods are used. The client process uses a GET request to access data from the sync server and a PUT request to update data to the sync server. The GET request that specifies the name and dataclass only retrieves the entire record. Also, the GUID can be appended using additional request parameters to allow filtering by entity types and predefined data views. Further, an option in PRIVATE can be specified to indicate the referred relationship and the record and all its reference relationships are returned in response.

In the GET request, the URL is specified to identify the record to be accessed from the sync server. When the client process sends a PUT call, a sync anchor is encoded in the HTTP header to persist the current sync state of the client process. In addition to the sync anchor, the sync mode is also encoded in the HTTP header. From the received sync anchor, the sync server can identify the changes not yet known to the client process.

To update data, using trickle-synching for example, a PUT request can be used to implement any number of field-level record changes. In response to the PUT request, the sync server returns field-level changes that the client process requesting the PUT has not seen yet. In the PUT request, the desired record changes are specified in the body of a message. The URL specified in the PUT call represents the dataclass to be updated. A single PUT call can be used to send multiple changes to the sync server and obtain updates from the sync server in the PUT response. By using GET and PUT, synchronizations can be stateless.

For GET and PUT, the payload transferred between the client process and the sync server is in XML. For GET, the payload is RECORD and PROPERTIES. For PUT, RECORD changes and PROPERTY changes are provided.

In addition, the sync protocol 146 uses custom X-headers for exchanging sync-specific data, such as client ids and sync anchors. For example, an X-header called X-ClientID can represent a client identifier that is unique among the syncing client processes for a user. The client identifier can be a device identifier or an application id. An X-header called X-Sync-Anchor can represent a sync anchor in a string format.

Data generation is bumped by the sync server when the data is published by another client process. Thus, when a client process supplies old version of the data, the sync server notifies the client process that the data pushed by the client process is invalid and the client process needs to pull the data to update its version. The X-SyncMode header can be sent by a client process with a value 'fast' (default) to indicate a fast sync, for example. Using a different value, the X-SynMode can be sent in a PUT call when the supplied data is supposed to replace the current data.

Indication of fast vs. slow sync is used to identify the relationship between the sync server and the client process, such as whether the client synced before, or whether the client process needs everything or whether the client is sending only the changes to the data. For example, when the client process needs everything, slow sync can be indicated. When the client process is just sending changes, fast sync can be indicated. The sync mode can be specified in the HTTP header. When a slow sync is desired, all of the data can be included in the PUT call and the slow sync can be specified in the same PUT call. Each PUT call includes an indication of a sync anchor and a sync mode.

As described above, the client application, such as Java SDK handles the enforcement of data relational integrity. This means, for example, if an e-mail address is deleted from contacts, the Java SDK creates all necessary record changes. By using the Java SDK, the sync server knows that all of the changes received from the Java SDK client are already correct. Thus, the work of enforcing relational integrity is offloaded to the client application.

The Java SDK enforces the relational integrity of data by static typing. A concrete class is provided for every entity, which is present in the sync service schema. Examples of these entity classes include a contacts class, an e-mail class, a phone number class, etc. Static methods are enforced in the Java SDK to ensure that a trusted client cannot do anything wrong with respect to relational integrity of data. For example, a Java SDK client can only set a phone number in a contact and thus cannot set a phone number in an event class. This is because the Java SDK knows the data relationship. For example, a calendar and an event in that calendar may be present. If that event in the calendar is removed, from the SDK perspective, only need to call 'events.delete' instead of 'events.calendar.delete.' The 'event.delete' call creates a record change of that delete operation for that event in that calendar. In addition, a modify operation is created for that calendar, which removes the event from the calendar-event relationship. Thus, the sync service schema in code is known to the Java SDK.

In addition to maintaining the relational integrity of data, the Java SDK maintains a cache of data which is currently used by the client process. By maintaining the cache, the data can be pushed further out to the client process and offloaded away from the sync server. Not every request from the client process needs to be sent to the sync server because the data is already cached in the middle layer (e.g., Java SDK) in a data context. For the address book example described above, in the beginning, the main contact record is accessed and loaded to populate the initial view in the client process, such as a browser. When a user clicks on the contact, all of the details for that contact (e.g., e-mail address, street address, phone number, etc.) are then loaded to be viewed by the user. This is one additional call to the sync server for that specific GUID and may require resolving all the relationships like e-mail address, street address, phone number, etc. But after that, all of the data for the contact is cached in the data context of the Java SDK. So, the next time the user clicks on that contact, there is no need to call on the sync server again. If a change to the same contact comes in from other client processes to the sync server, the client process is notified of that change and next time the client process calls sync, that change is returned from the sync server. This can be done by using a flag in the data context that indicates (when set) that the sync server has changes for the client process. As long as the flag is not set and the client process doesn't provide any changes itself, the sync call does not actually go to the sync server. Whenever another client process supplies another change, then the sync server notifies client process that there are changes on the sync server side. So, the next time client process comes in with no changes, the data context is marked as dirty or invalid and that sync request is forwarded to the sync server. This reduces the number of calls to the sync server.

The client process that supports the sync protocol 146 can be either a trusted client or an untrusted client. All Java SDK clients are trusted client by the virtue of the Java SDK enforcing the relational integrity. The indication of trusted vs. untrusted client process is used by the sync server to identify whether the data sent by the client process conforms to the sync server's data model, the correctness of the data. For an untrusted client, when a change to a record comes in (e.g., deleting the event in the calendar as described above), the sync server would have to generate the modify of the calendar. However, for the trusted client (e.g., Java SDK client), that modify of the calendar-event relationship is already completed by the Java SDK.

When a user, through a client process, modifies a record or multiple records, those changes have to be synced with the sync server. The timing and frequency of syncing can vary. For example, the client process can determine how long to wait in between each sync. The frequency of syncing can be as often as the number of modifications implemented by the user. Also, the client process can wait until a number of changes have accumulated. When the client process decides to sync, the client process sends a PUT call that contains the changes to the sync server. The reply message from the sync server may contain any server-side changes that the client process hasn't seen yet or are a result of the sync server applying relational integrity rules, such as generating cascading deletes (if the client process is not trusted). The client process can decide what to do with the received changes. For example, the client process can put any newly added contact records in a local cache and update a local view to show the newly added contact records in a list of contacts. Similarly, deletions can result in the application removing those entries from the view and the cache. Modifications can be ignored unless the modifications are for records that are already cached, in which case the changes can be applied to the cached record.

Figure 5A:
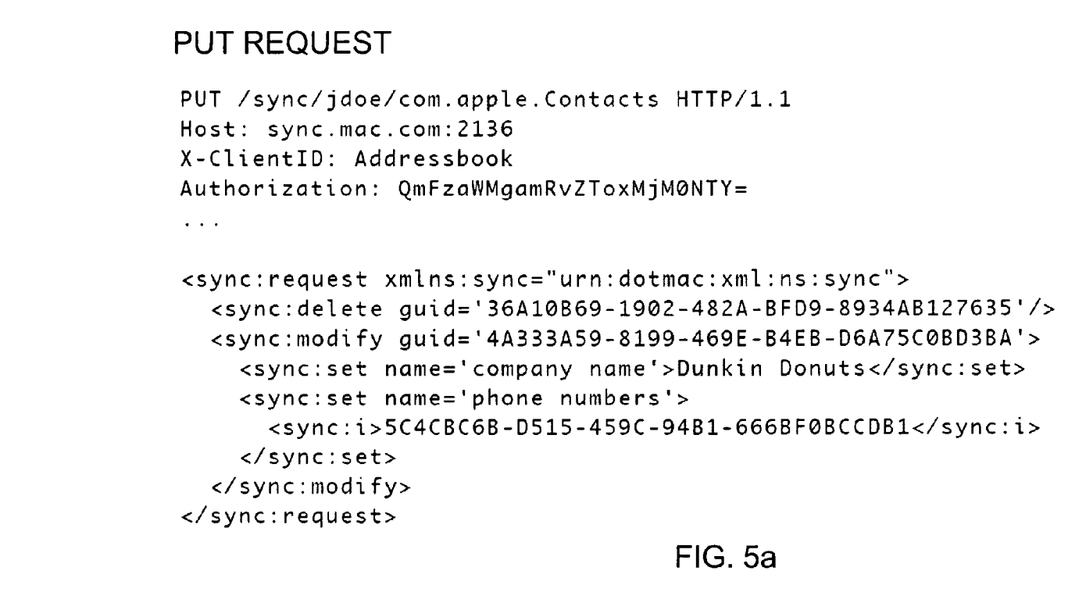
FIGS. 5a-5b show an example request message from a client process and a reply message from a sync server respectively.
Figure 5B:
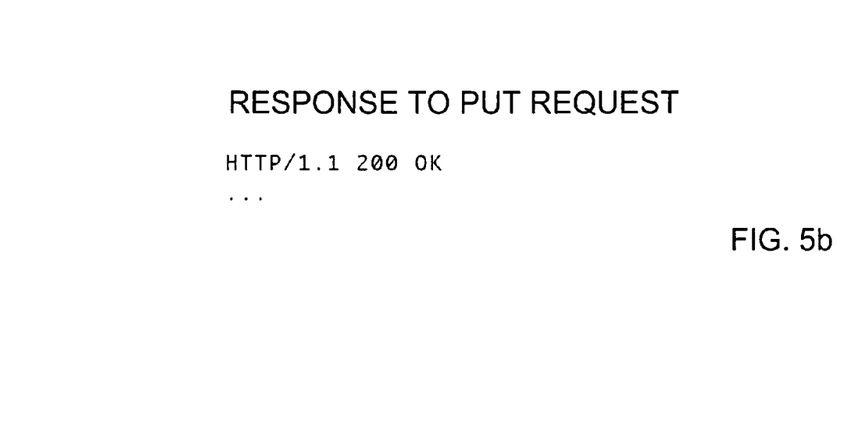

FIGS. 5a-5b show an example request message from a client process and a response message from a sync server respectively. A user has made the following modifications: (1) changed the company name for the "Homer Simpson" contact; and (2) removed a phone number from the same record. Those changes will result in the following record changes: (1) one record deletion (the phone number); and (2) one record modify (the "Homer Simpson" contact).

Figure 6:
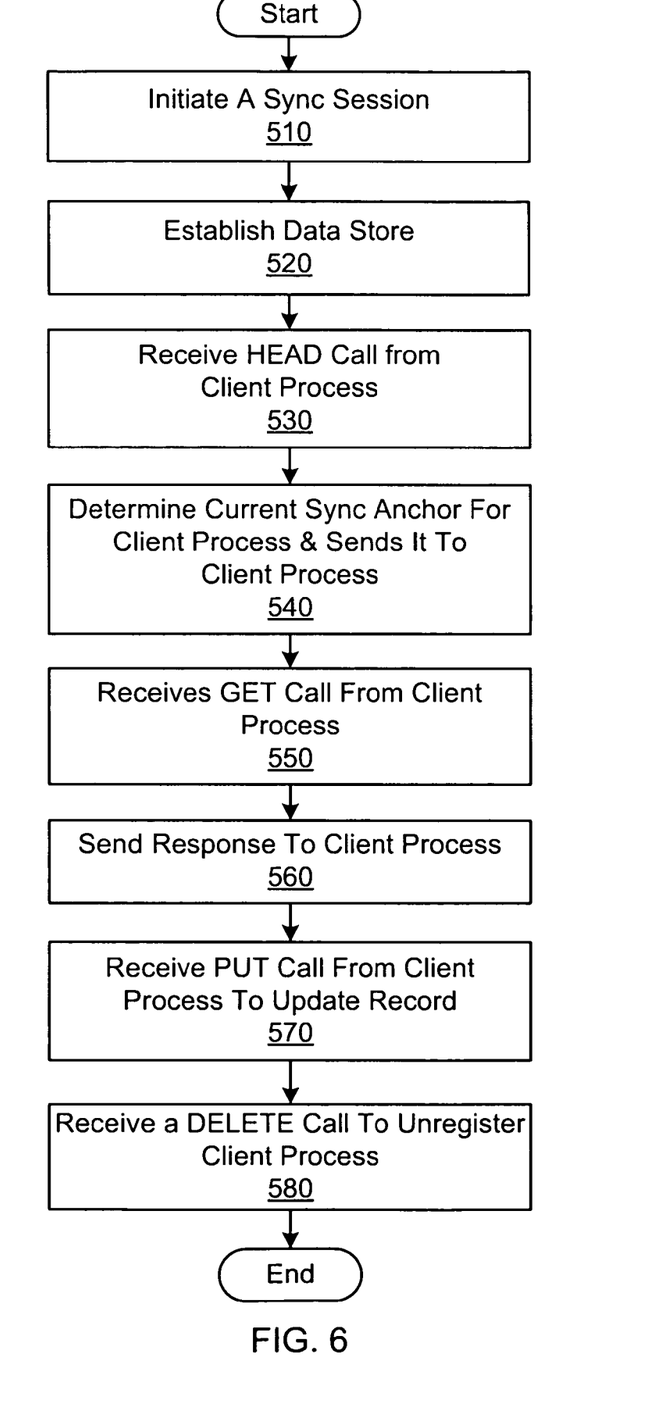
FIG. 6 is a process flow diagram showing an example sync process.

FIG. 6 shows an example process 600 for a client process to sync with a sync server. For illustrative purposes, the process 600 is described with respect to a Java SDK as the client application. A user initiates a session using a client process (e.g. client process 120), such as a web application to communicate with a sync server (e.g., sync server 110) (610). On the user's behalf, the web application establishes as a part of the Java SDK, a data store, such as data context (620). The data context includes store objects for every dataclass, such as a store for address book, for example, associated with contacts dataclass. As the store object is created, Java SDK sends a HEAD call to the sync server to register this client process and get latest sync anchor (630). The HEAD call contains client identifications and other HTTP headers. As described above, the client identification is a random GUID generated by the web application.

When the sync server receives the HEAD request, the sync server determines the latest sync anchor for that client and sends it back to the web application (640). Thus far, no data (for adding, deleting, updating) is sent back and forth between the client process and the sync server. Only a communication link has been established between the client process and the sync server. The client process determines how much data to put on (or pull out) to/from the sync server. The client process can identify the entity type to access in a GET call (650). For example, in an address book application, at start up, only the first name and last name are downloaded. Thus, only the main contact record is downloaded and not the sub components like e-mail addresses and street addresses and so on. This is because that's all the client process needs to display the initial view of the contacts. This is one GET request, and in the URL and the optional parameters of the single GET request, entity types to access are identified. In response to the GET request, the sync server sends back those identified records in a response message (660). The client process gets the record back in a format compatible with the client process. For example, the data can be in JavaScript Object Notation (JSON) when sent to a web browser.

The Java SDK maintains the data contexts in an internal cache, and the records identified in the GET request is cached in the data contexts of the Java SDK. This enables the Java SDK to acts as a middle layer cache between the client process and the sync server.

When the user modifies the record, for example modifies the last name of an entry, that change is sent back from the client process to the Java SDK. The Java SDK has the modified record in the cache and calls one of the SDK methods (e.g., PUT) to update the last name (670). The Java SDK looks up the contact by its GUID, which was also sent by the client process, and then calls the 'contacts.lastname' record element with the current value. Inside the Java SDK, this generates the right record change, and when the client process calls the sync on the stored object, a PUT call is initiated with the sync server. When the client is done, the Java SDK sends a DELETE call to the sync server to unregister the client process and stop the notification (680). The sync session terminates at this point.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A system comprising:
    a data repository configured to store one or more data records;
    a server in communication with the data repository, wherein the server is configured to access the data repository in response to a synchronization request to perform at least one of the following:
        access the one or more data records,
        add the one or more data records, and
        modify the one or more data records; and
    a client application comprising a protocol library in communication with the server, the client application configured to:
        receive the synchronization request through a client process,
        encapsulate the synchronization request using a representational state transfer (REST) protocol that provides communications between the client process and the server,
        forward the encapsulated synchronization request to the server using the REST protocol, and
        determine whether the data records in the data repository has been changed by another client process and update a stored cache based on a result of the determination.

2. The system of claim 1, wherein the client application comprises a Java application.

3. The system of claim 1, wherein the client application is embedded within the client process.

4. The system of claim 1, wherein the client application is configured to operate as a server-side process.

5. The system of claim 1, wherein the client application is configured to receive the synchronization request through the client process that comprises a web browser.

6. The system of claim 1, wherein encapsulating the synchronization request enables the client process to communicate with the server without knowledge of details of the protocol.

7. The system of claim 1, wherein encapsulating the synchronization request enables the server to identify the client process as a trusted client, wherein the server assumes correctness of data provided by the trusted client.

8. The system of claim 1, wherein the server is configured to, in response to the forwarded request,
    access the data repository;
    obtain data identified in the forwarded request from the one or more data records; and
    forward the obtained data identified in the forwarded request in a reply message to the client application.

9. The system of claim 8, wherein the client application comprises a cache to temporarily store the data received in the reply message from the server.

10. The system of claim 9, wherein the client application is configured to:
    receive another request through the client process;
    detect whether the temporarily stored data is valid; and
    access the temporarily stored data instead of forwarding the received other request to the server when detecting that the temporarily stored data is valid.

11. A method comprising:
at a data processing apparatus, performing the following:
receiving, from a client process, a request to perform a synchronization operation comprising at least one of the following:
access one or more data records stored at a data repository,
add one or more data records to the data repository, and
modify one or more data records stored at the data repository;
encapsulating the received request using a representational state transfer (REST) protocol for communicating the received synchronization operation request to a server;
communicating the encapsulated received request to the server using the REST protocol to instruct the server to access the data repository to perform the requested synchronization operation; and
determining whether the data records in the data repository has been changed by another client process and updating a stored cache based on a result of the determination.

12. The method of claim 11, wherein receiving the request comprises receiving the request at the data processing apparatus using a client application that comprises a Java application.

13. The method of claim 12, wherein the client application is embedded within a client process.

14. The method of claim 11, wherein the data processing apparatus comprises another server.

15. The method of claim 12, wherein the client application is embedded in a web browser.

16. The method of claim 12, wherein the client application comprises a protocol library to encapsulate the protocol along with functionalities of the protocol.

17. The method of claim 11, wherein encapsulating the received request comprises encapsulating the protocol to guarantee correctness of data provided to the server.

18. The method of claim 11, further comprising:
at the data processing apparatus, in response to communicating the encapsulated received request to the server, obtaining data identified in the encapsulated received request associated with the one or more data records stored in the data repository.

19. The method of claim 18, further comprising:
temporarily storing the obtained data.

20. The method of claim 19, further comprising:
at the data processing apparatus:
receiving another request;
detecting whether the temporarily stored data is valid; and
accessing the temporarily stored data instead of forwarding the received other request to the server when detecting that the temporarily stored data is valid.

21. A computer program product, embodied on a non-transitory computer readable medium, operable to cause a data processing apparatus to perform operations comprising:
receiving a request at a client application and through a client process to perform a synchronization operation comprising at least one of the following:
access one or more data records stored in a data repository,
add one or more data records to the data repository, and
modify the one or more data records stored in the data repository;
encapsulating the received request using a representational state transfer (REST) protocol for communicating the received request to a server;
communicating the encapsulated received request to the server using the REST protocol to instruct the server to access the data repository to perform the requested synchronization operation; and
determining whether the data records in the data repository has been changed by another client process and updating a stored cache based on a result of the determination.

22. The computer program product of claim 21, further operable to cause a data processing apparatus to receive the request using a client application comprising a Java application.

23. The computer program product of claim 22, further operable to cause a data processing apparatus to receive the request using the client application that is embedded within a client process.

24. The computer program product of claim 21, further operable to cause a data processing apparatus comprising another server to receive the request.

25. The computer program product of claim 22, further operable to cause a data processing apparatus to receive the request using the client application embedded in a web browser.

26. The computer program product of claim 22, further operable to cause a data processing apparatus to use the client application comprising a protocol library to encapsulate the protocol along with functionalities of the protocol.

27. The computer program product of claim 21, further operable to cause a data processing apparatus to encapsulate the protocol to guarantee correctness of data provided to the server.

28. The computer program product of claim 21, further operable to cause a data processing apparatus to perform operations, in response to communicating the encapsulated received request to the server, comprising:
obtaining data identified in the encapsulated received request associated with the one or more data records in the accessed data repository.

29. The computer program product of claim 28, further operable to cause a data processing apparatus to temporarily store the obtained data.

30. The computer program product of claim 29, further operable to cause a data processing apparatus to verify validity of the obtained data comprising:
receiving another request;
detecting whether the temporarily stored data is valid; and
accessing the temporarily stored data instead of forwarding the received other request to the server when detecting that the temporarily stored data is valid.

* * * * *